United States Patent
Conley

(10) Patent No.: US 9,565,836 B2
(45) Date of Patent: Feb. 14, 2017

(54) UNIVERSALLY ATTACHABLE LEASH BAG FOR THE SANITARY COLLECTION AND TRANSPORT OF PET WASTE AND PERSONAL ITEMS

(71) Applicant: Christine H Conley, Lindenhurst, IL (US)

(72) Inventor: Christine H Conley, Lindenhurst, IL (US)

(*) Notice: Subject to any disclaimer, the term of this patent is extended or adjusted under 35 U.S.C. 154(b) by 0 days.

(21) Appl. No.: 14/534,666

(22) Filed: Nov. 6, 2014

(65) Prior Publication Data
US 2016/0128306 A1 May 12, 2016

(51) Int. Cl.
A01K 29/00 (2006.01)
A01K 27/00 (2006.01)
B31B 29/60 (2006.01)

(52) U.S. Cl.
CPC .............. *A01K 27/008* (2013.01); *B31B 29/60* (2013.01)

(58) Field of Classification Search
CPC ... E01H 1/1206; A01K 23/005; A01K 27/004; A01K 27/003; A01K 27/008; B65D 31/12; A45C 11/20; A45F 5/004; A45F 3/005; A45F 3/00; A45F 5/021; A45F 5/02; B31B 29/60
See application file for complete search history.

(56) References Cited

U.S. PATENT DOCUMENTS

| | | | |
|---|---|---|---|
| 4,226,456 A | 10/1980 | Barnett | |
| 4,244,408 A | 1/1981 | Shoda | |
| 4,418,733 A | 12/1983 | Kallman | |
| 5,265,719 A * | 11/1993 | Wand | 206/223 |
| 5,441,017 A | 8/1995 | Lindsay | |
| 5,447,227 A | 9/1995 | Kosberg | |
| 5,540,469 A | 7/1996 | Albert | |
| 5,560,321 A | 10/1996 | Hess | |
| 5,713,616 A | 2/1998 | Knudson | |
| 5,718,192 A | 2/1998 | Sebastian | |
| 5,727,500 A | 3/1998 | Conboy | |
| D393,504 S | 4/1998 | Eisman | |
| 5,887,772 A | 3/1999 | Dooley | |
| 5,890,637 A | 4/1999 | Furneaux | |
| 6,019,067 A | 2/2000 | Carey | |

(Continued)

FOREIGN PATENT DOCUMENTS

| | | |
|---|---|---|
| EP | 0619944 A1 | 10/1994 |
| EP | 1111990 A1 | 7/2001 |

*Primary Examiner* — Stephen Vu
(74) *Attorney, Agent, or Firm* — David J. Smith

(57) ABSTRACT

One embodiment of a universally attachable leash bag having an interior chamber for temporary storage of retrieved pet waste secured in waste bags and exterior pockets for supplies or personal belongings. Bag is formed of a single piece of material fitted with a zipper along the lower edges and partially up the side edges. When engaged, zipper creates a bag form with interior chamber. Zipper is utilized when emptying the chamber to prevent pet owner from direct handling of waste. The vertically extended sides of the bag, fitted with corresponding members of hook-and-loop tape, feed through the pet leash handle forming a secure method of attachment. The front edge of leash bag is fitted with a reinforcing device to create an opening for the extended end of the leash to pass through creating a secondary means of attachment and a utility hook for carrying items or tertiary means of attachment.

14 Claims, 4 Drawing Sheets

(56) References Cited

U.S. PATENT DOCUMENTS

| | | | | |
|---|---|---|---|---|
| 6,035,809 | A | 3/2000 | Fingerett | |
| 6,073,590 | A | 6/2000 | Polding | |
| 6,076,717 | A | 6/2000 | Edwards | |
| 6,085,695 | A | 7/2000 | Miller | |
| 6,199,737 | B1 | 3/2001 | Ringelstetter | |
| 6,237,533 | B1 | 5/2001 | Rodriguez | |
| 6,257,473 | B1 | 7/2001 | Ringelstetter | |
| 6,314,917 | B1 | 11/2001 | Ryan | |
| 6,418,881 | B1 | 7/2002 | Starratt | |
| 6,571,745 | B2 | 6/2003 | Kerrigan | |
| 6,588,375 | B2 | 7/2003 | Benedettini | |
| D488,591 | S | 4/2004 | Hall | |
| 6,964,247 | B1 | 11/2005 | Lin | |
| 6,991,373 | B2 * | 1/2006 | Carr et al. | 383/111 |
| 7,073,462 | B1 * | 7/2006 | Layman | A01K 27/008 119/161 |
| 7,367,286 | B2 | 5/2008 | Beaupre | |
| 7,410,197 | B2 | 8/2008 | Edwards | |
| 7,506,615 | B1 | 3/2009 | Sansone | |
| 7,695,034 | B2 | 4/2010 | Anderson | |
| 7,704,577 | B2 | 4/2010 | Shoda | |
| 7,976,083 | B2 | 7/2011 | Black | |
| 8,038,188 | B1 * | 10/2011 | Nolan-Brown | 294/1.3 |
| 8,113,481 | B1 | 2/2012 | Krysak | |
| 8,186,311 | B2 | 5/2012 | Longo | |
| 8,196,980 | B1 | 6/2012 | Banks | |
| 8,256,384 | B2 | 9/2012 | Wheeler | |
| 8,353,603 | B2 | 1/2013 | Berry | |
| 8,397,915 | B2 | 3/2013 | Davidson | |
| 8,720,384 | B2 | 5/2014 | Gee | |
| 8,839,745 | B1 | 9/2014 | Johnston | |
| 2005/0115520 | A1 | 6/2005 | Mancini | |
| 2006/0054107 | A1 | 3/2006 | Baker | |
| 2006/0207522 | A1 | 9/2006 | Perkitny | |
| 2006/0231043 | A1 * | 10/2006 | Galdo | 119/796 |
| 2007/0204805 | A1 | 9/2007 | Brody | |
| 2008/0137994 | A1 * | 6/2008 | Urbina | A01K 27/006 383/41 |
| 2009/0095225 | A1 | 4/2009 | O'Connell | |
| 2009/0261604 | A1 | 10/2009 | Rodriguez | |
| 2011/0197820 | A1 | 8/2011 | Goldy | |
| 2011/0239957 | A1 | 10/2011 | Washington | |
| 2012/0193386 | A1 | 8/2012 | McFarland | |

* cited by examiner

UNIVERSALLY ATTACHABLE LEASH BAG FOR THE SANITARY COLLECTION AND TRANSPORT OF PET WASTE AND PERSONAL ITEMS

CROSS-REFERENCE TO RELATED APPLICATIONS

This application claims the benefit of PPA Ser. No. 61/962,496, filed 2013 Nov. 8 by the present inventor, which is incorporated by reference.

BACKGROUND

Prior Art

This invention relates generally to pet waste collection and more specifically to providing an improved method to sanitarily transport waste in a pet waste collection pouch with an inner chamber designed for the temporary storage of bags or other containers holding pet waste, outer pockets suitable for holding and dispensing fresh pet waste bags for the purpose of collecting said pet waste, pet owner's personal belongings, dog treats, or other personal effects for an outing, and to be carried by means of attachment to either the pet's leash or a supplemental carrying strap worn on or across the body of the pet owner/walker or other methods including, but not limited to attachment to a belt, or by hand, pouch includes an easily accessible release method for emptying the collected pet waste without need to re-handle the waste-laden waste bags.

The art has long sought a method of transporting pet owner personal belongings and dog walking supplies while providing a convenient, sanitary means for retrieving, storing and transporting of animal waste matter, particularly fecal material deposited by domestic dogs traveling with their owner along the public ways, such as on city sidewalks, park trails, public and private lawns, school yards and public and private urban and country areas. Many states, cities and municipalities have leash-laws laws requiring domestic pet animals be secured by leash while traveling along the public way, and further, to enforce the retrieval of their fecal deposits. Simply put, the pet owners are required to "pick-up" after their dogs to inhibit the health risk associated with the presence of such waste, including preventing others from stepping in or on the waste and/or to prevent the waste from entering our waterways.

The prior art has provided an array of apparatus for use in aiding pet owners with the odious and generally unpleasant task involved in collecting dog feces left by their pets. So-called "pooper scoopers", a newspaper, tissue and/or plastic litter bags have become necessary accompaniments to the dog owner walking his or her dog. Prior art indicates waste storage and transporting devices. The design of such devices include wallet-like pouches or canisters which can be worn about the dog walker's waist in belt-like fashion; back-pack type devices designed to be worn by the dog itself; plastic clips attached to a leash which allow a plastic, waste-filled bag to suspend from them; pouches which are integral to a specific leash; and most recently multi-pocket, zippered bags suspended from leash or worn about the dog walker's wrist with a tether. The prior art apparatus available for use as a temporary waste receptacle and means of transporting said waste to disposal often provide only one primary function such as holding a supply of clean waste bags, carrying pet owner's belongings, or the storage of filled waste containers, which fails to address the needs of the dog walker to carry personal belongings, pick-up supplies, and retrieved waste. Additionally, the apparatus designed for multiple uses can been cumbersome to carry and awkward to use. Many are difficult or time consuming to open for use; have minimal openings in which to place waste; require hands-on removal of waste, which may result in bodily contamination; are ineffective at odor control; lack storage pockets for transporting personal belongings such as emergency medications, sanitary wipes or gel, cell phone, keys and other items necessary for a walk with a dog.

Some of these devices provide containers which are box-like with zippered or detachable lids so that the feces deposit is scooped manually from its drop site and placed in such container. Containers of such type are often ungainly to carry and to use. Additionally, such containers also often have minimal openings in which to place pet waste which limits their use to owners with dogs creating small waste piles. Furthermore, these minimal openings may result in hands-on pet waste contamination. As a result of such limited openings, post-use sanitation of the carrying device can be difficult or impossible.

Other proposed devices require multiple steps to open one area of container for removal of empty waste bag, open a second area of the container to deposit the filled waste bag, then closing of said areas to secure waste within container. These steps may often be attempted while holding a leash and possibly personal belongings such as gloves or cell phone, while still trying to maintain control of dog.

In addition, trying to place the deposit into a temporary holding container may be difficult, also resulting in unsanitary contact with the fecal waste. Many proposed devices have inconvenient access to the holding containers and are not easily cleaned after use. In addition, carrying the retrieved deposit via a clip-type carrier attached to a leash until a suitable depository, such as a refuse or garbage container, is reached can be a serious problem, primarily due to failure or breakage of waste containment bags; breakage can cause fecal matter to fall from the bag without warning which could contaminate a public area, the dog or dog walker. Further, pet owners often must carry multiple supplies like fresh plastic bags, water bottle, keys, cell phone and other belongings by hand, which makes the act of retrieving and disposing of pet waste more difficult as they try to manage their belongings, their dog, a waste bag, and the retrieved waste, resulting in greater risk of contamination while performing their custodial duty.

Of the patented art dealing with the problem of pet waste retrieval and transportation, several patents are considered in indicating the state of the art as to efforts to alleviate the issues relevant to pet waste collection and transportation prior to disposal. The following is a tabulation of some prior art that presently appears relevant:

U.S. Patents

| Patent Number | Kind Code | Issue Date | Patentee |
| --- | --- | --- | --- |
| 5713616 | A | 1998 Feb. 3 | Knudson |
| 8256384 | B2 | 2014 Sep. 4 | Wheeler |
| 5727500 | A | 1998 Mar. 17 | Conboy |
| 6257473 | B1 | 2001 Jul. 10 | Ringelstetter |
| 6199737 | B1 | 2001 Mar. 13 | Ringelstetter |
| 6035809 | A | 2000 Mar. 14 | Fingerett |

U.S. Patent Application Publications

| Publication Nr. | Kind Code | Publ. Date | Applicant |
|---|---|---|---|
| 20120193386 | A1 | 2011 Jan. 21 | McFarland |

Knudson provides a purse-like receptacle having a chamber for receiving loaded plastic bags. This chamber has a closure flap which includes a pocket for containing fresh (unused) plastic litter bags, at least a pair of front pockets and a pair of foldable pleated side walls. The flap pocket is closed by a zipper. Likewise, a zipper is provided in at least one of the side walls for establishing selective access to one of the front pockets. The zipper in the side wall can extend around the bottom of the chamber to provide access to the entire interior of the chamber for cleaning, as necessary. Rings are attached by loops formed of canvas or secured to the receptacle. A belt can be threaded through the rings for transport of the receptacle by the pet owner wearing same.

The Knudson unit must be carried by the pet owner using a shoulder strap or on the owner's belt and has no method allowing it to be carried by leash attachment. Thereby, this device places the dog excrement in a pouch touching against a pet owner's body, something found to be less than desirable. The opening of the flap pocket along the side of the flap exposes the interior of the pocket and the contents thereof to excrement introduced to the interior of the chamber when the paddle scoop is employed. When a waste bag is contaminated by excrement within the interior pocket, the user is then prone to contamination when he removes the waste bag from the interior pocket for disposal. Thus, unmet needs of prior art remain with the Knudson proposed unit.

The Wheeler patent describes a leash-mounted storage device which comprises a leash housing, a waste storage compartment, a sanitary compartment, a sanitary wipe dispensing slot, a sanitary bag dispensing slot, a leash securing hole, a front lid button, a rear lid button, a handle and a battery storage compartment. In addition a flashlight and panic button are also included. The design of this device, with all of its components, would be found rather bulky for the average user. While the Wheeler device provides space for waste bags, sanitary wipes, pet waste, a flashlight, a leash, a panic button and batteries, there is no mention of a space for the user to place keys, a cell phone, water bottle, dog treats, or any number of items a user would prefer carrying over the pre-determined ones of this device. The Wheeler patented device integrates a specific retractable leash, which creates a future problem when the leash breaks, especially if a replacement cannot be found. The Wheeler device addresses some of the unmet needs of prior art, but still many remain unmet.

The Conboy patent describes a leash-mounted storage device which provides front and rear pouches attached together defining a channel to accommodate the passage of a leash. The leash is passed through the channel between the front and rear pouches. Both the front and rear pouches are foldable for transport. The front pouch has a longitudinal overlapping opening for receiving a supply of disposable litter bags and has an open top provided with a "hook and pile" closure at the interior of the mouth of the open top. The rear pouch is attached to the back of the front pouch to define the channel. A pair of "hook and pile" fastening straps are secured to the back of the front pouch at spaced positions. One of the fastening straps is passed through the hand-loop of the leash while the other of the fastening straps is wrapped around an intermediate length of the leash to secure the storage portion at a fixed position along the leash.

In the Conboy unit, the front pouch has a top opening but remains folded until used. The front pouch receives the waste-loaded closed and tied litter bags when the pouch is unfolded. The "hook and pile" closure is positioned at the lower exterior closed end of the front pouch to support the front pouch in folded condition. The Conboy storage device can be used for holding useful pet-related items such as pet toys, pet medication, water container, etc. when not used for carrying the waste-loaded litter bags. However, there is no provision for carrying any of these items in either of the front or rear pouches if one or the other or both are used to carry waste-loaded litter bags. The Conboy storage also meets some, but not all of the unmet needs indicated in prior art, including the inability to be carried by multiple types of leashes, as well as an option to be carried by the user.

Another prior art device described in two patents issued to Ringelstetter in 2001 describes a sanitary pet-waste collection pouch. The pouch includes an interior open-topped chamber for holding tied loaded plastic bags containing retrieved pet-waste, deep-side pockets for carrying a hand-sanitizer dispensing container. The sanitary collection holder's complex structure causes difficulty when cleaning the sanitary pet-waste collection pouch. In addition, is cumbersome to carry and use when loaded, presents difficulty/delay in retrieving pet waste as a bag is taken from one closed area, then another area has to be opened before depositing the filled bag. The Ringelstetter device is attachable in a variety of ways, but still does not meet all the unmet needs of prior art.

The Fingerett patent describes a leash pouch for holding disposable bags and animal waste when walking animals. The leash pouch attaches to a leash using a mounting device to free the pet owner's hands. A disposable bag compartment is on the left surface of the pouch and a waste compartment is located on the right surface of the pouch. The pet owner picks up the waste with a disposable bag and places it in the waste compartment for later disposal. However, as designed, such a leash pouch attaches to a rigid case leash, i.e. retractable leash, but requires an additional mounting fixture to use with a regular leash and hence the leash pouch is not economical. Further, a user cannot easily access the waste compartment in the leash pouch.

The McFarland patent application indicates a bag with multiple compartments, one for disposable bags, two for accessories such as cell phone, gloves, flashlight, and a main one for holding waste-containing bags as well as a small pouch which holds disposable bags. As in other prior art, the McFarland device does not meet all the unmet needs as its wrist carrying strap provides only one method of carrying or attachment, has multiple fixed-size pockets which must be manually opened and closed with use, and in the event of contamination, may be difficult to clean.

Prior art has sought to provide a multifunctional pet leash organizer and pet waste storage device to meet the needs of a dog walker, but as evidenced in prior art, unmet needs still exist.

SUMMARY

In accordance with one embodiment a universally attachable leash bag for sanitary collection and transport of pet waste and personal items, having a interior storage compartment for waste, exterior pockets for personal or dog-walking items, a primary attachment method, a secondary attachment method, a utility hook for attaching waste bag dispenser, keys or other items or to serve as a tertiary means of attachment and a hands-off method of emptying waste from storage compartment.

Advantages

There remains a need for a multifunctional pet leash organizer and pet waste storage device that provides an efficient, sanitary solution to manage pet waste temporary storage and transportation and several personal and pet related items used while walking pets combined into a single device.

Accordingly, several advantages of one or more aspects are as follows: device would provide an easily-accessible pet waste storage compartment, easy and sanitary waste emptying method, and additional storage for clean pick-up bags, sanitary wipes, or any other item a user may desire to carry. In addition, the proposed device would be of a simplified, yet sturdy design, providing simplified construction and use, while still providing pet owners a beneficial, sanitary method of carrying pet waste between pick-up and disposal. Proposed device is attachable to a multitude of leash types and styles and also provides alternative methods of carrying or attachment to items other than a leash. The proposed device has an interior and exterior pockets which are not dedicated to specific duties, whereby allowing user to carry whatever items deemed necessary versus utilizing space for specifics like hand sanitizer they may not care to transport. The proposed device has an open-top waste storage compartment, and in one embodiment the proposed device is constructed out of material with an inherent odor-absorbing or odor-minimizing material; this material is also waterproof. The proposed device has a minimalist approach and provides a less bulky method of transporting personal items and dog waste. Proposed device is formed from a solitary, unseamed piece of fabric, thereby eliminating additional possible failure points and also improving the integrity of leash bag. Proposed device can be made in various sizes, allowing user to scale up or down to meet their needs in terms of items carried and size of waste load. Because of its cut form and method of construction, the proposed device also maintains its shape even when empty. The proposed device accomplishes each of these objectives and meets the unmet needs of prior art devices. Other advantages of one or more aspects will be apparent from consideration of the drawings and ensuing description.

Insofar as I am aware, no leash bag or pet waste carrying device formerly developed encompasses ease-of-use, inherent sanitary properties, practicality, stability and the aesthetics desired by dog owners who walk and pick up after their dogs.

DRAWINGS

Figures

DRAWINGS

Reference Numerals

Figure 1:
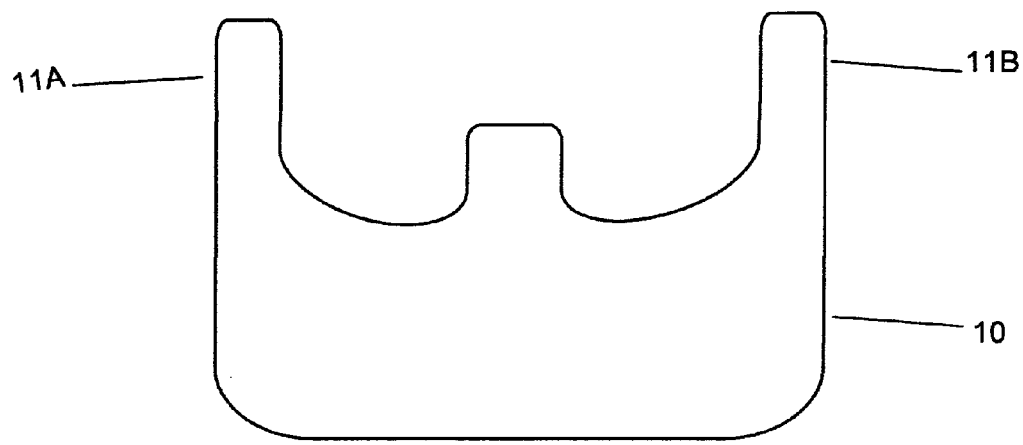
FIG. 1 is a front view of the shape in which the improved leash bag is cut.

10 bag cut form
11A vertical extension forming rear wall retainer strap
11B vertical extension forming front wall retainer strap
12A zipper on left side wall and left side lower edge
12B zipper on right wall and right lower edge
12C zipper pull
13 reinforced leash access orifice
14A one portion of hook-and-loop tape
14B corresponding portion of hook-and-loop tape
15 exterior top-opening pocket
16 utility hook attachment strap
17 utility hook
18 vertical stitching to create divided pockets

DETAILED DESCRIPTION

FIGS. 1-7—First Embodiment

FIG. 1 is a front view of the shape in which the leash bag is cut. The left and right sides of the bag 10 are vertically extended to form retainer straps 11A 11B. The center portion is slightly raised; the areas between the center and extended portions 11A 11B are downwardly curved. Leash bag is formed from a solitary, unseamed flat piece of fabric, thereby eliminating additional possible failure points and also improving the integrity of leash bag 10. In this embodiment, the elongated and curved edges are finished by means of sewn edge banding (not shown). Other embodiments may include finishing by zig-zag or overlock stitching, gluing or with no edge finish at all.

Figure 2:
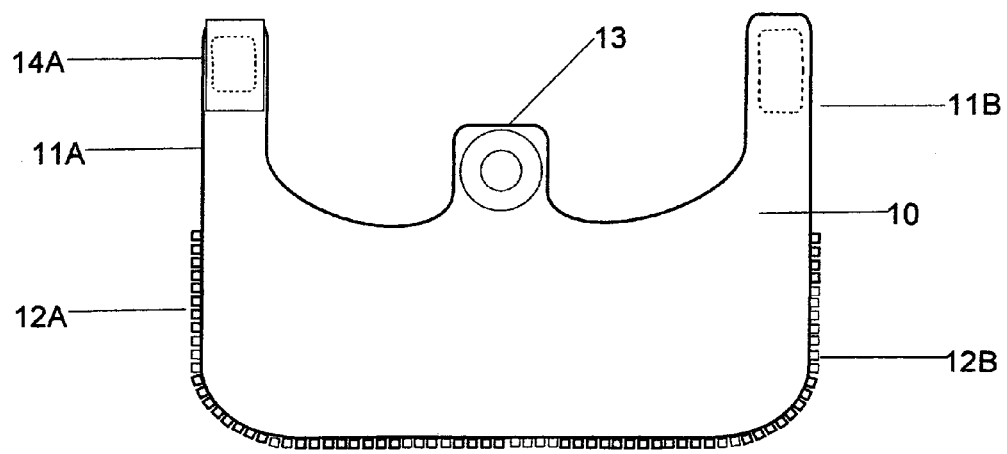
FIG. 2 is a front view of the improved leash bag with the attachment and closure means indicated.

FIG. 2 is a front view of leash bag 10 indicating the attachment and closure means of vertically extended straps 11A 11B with one portion of hook-and-loop tape 14A to be secured by stitching and/or gluing to both sides of the upper portion of retainer strap 11A. Corresponding portion of hook-and-loop tape to be sewn to one side of upper portion of retainer strap 11B. Said portion of hook-and-look tape to have an unstitched extension to wrap around the inside portion of hook-and-loop tape 14A. In addition, the reinforced leash-access orifice 13 will be placed in the slightly elevated area between the retainer straps 11A 11B. Further shown are two halves of a releasable engaging closure. In this embodiment the members are the two halves of a zipper closure 12A 12B which are to be sewn and/or glued onto the lower half of the exterior outermost left and right side edges of the leash bag 10, each half continuing across to the center point of the lower edge. Additional embodiments may substitute the zipper closure and hook-and-loop tape with other releasable engaging members.

Figure 3:
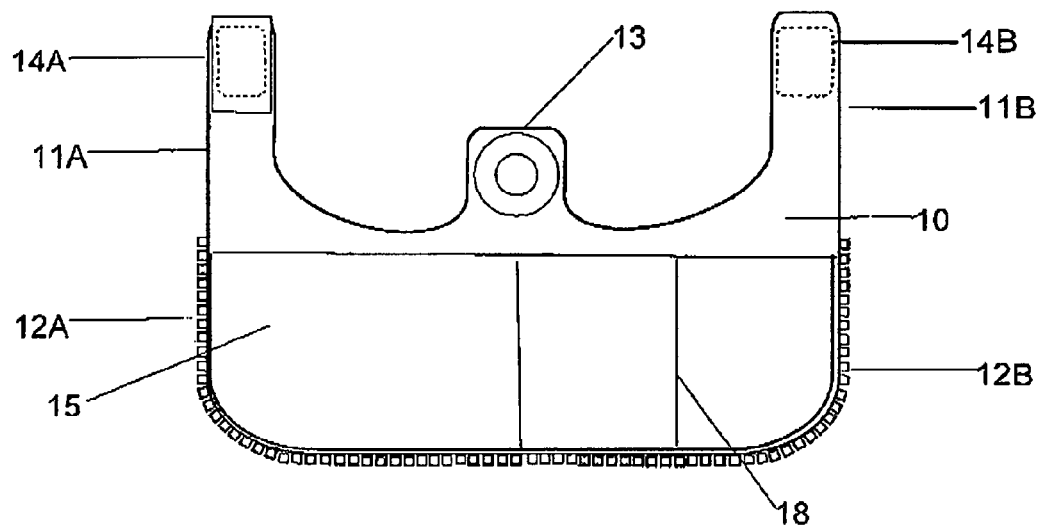
FIG. 3 is a front view of the improved leash bag with the addition of the exterior top-opening pocket.

FIG. 3 is a front view of the leash bag with the addition of the exterior top-opening pocket 15. Said pocket is attached by stitching the left, bottom and right edges of the pocket fabric onto the exterior lower half of the outermost left and right side edges and across lower edge of leash bag 10 over the selvedge edges of the previously attached zipper 12A 12B. Pocket may form a single storage area, or be divided by vertical stitching 18, thereby forming additional storage areas. In this embodiment pocket is formed of mesh material with elasticized top. Additional embodiments may have pocket made of any suitable material and may or may not have an elasticized top edge and may or may not include a closure flap. Additionally, other embodiments may include pockets of mixed materials and sizes.

Figure 4:
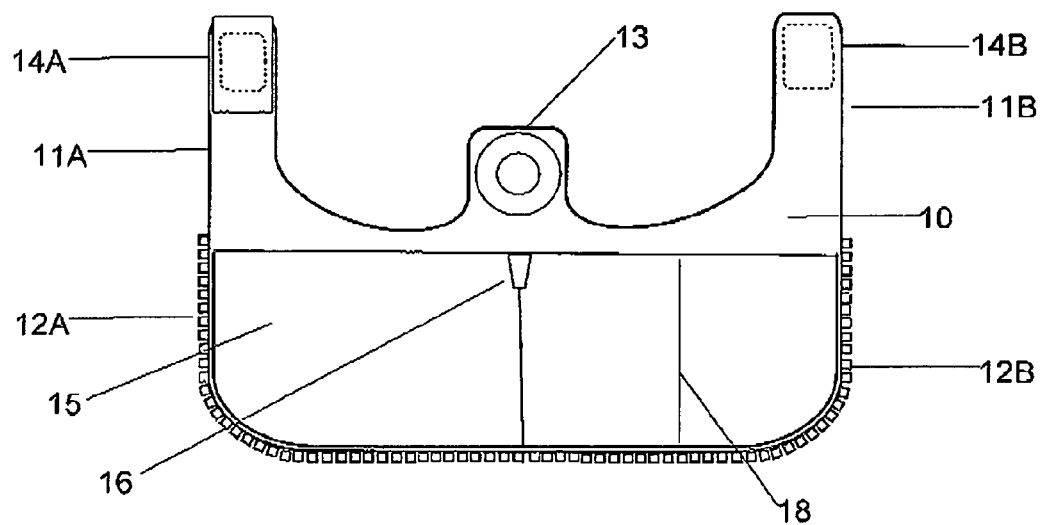
FIG. 4 is a front view of the improved leash bag with the addition of the hook attachment strap.

FIG. 4 is a front view of leash bag with the addition of the utility hook attachment strap 16. Strap may be formed by looping a piece of webbing or other similar material and stitching and/or gluing to the front portion of the leash bag 10 beneath the reinforced leash access orifice 13. Additional embodiments may include straps and hooks placed at other areas of the bag 10 or the absence of straps and hooks.

Figure 5:
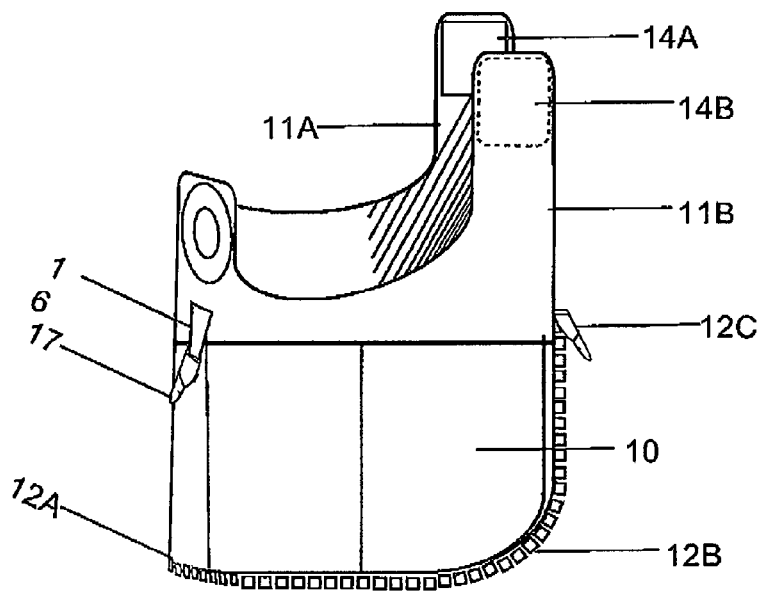
FIG. 5 is a perspective view of the improved leash bag, showing how it is readied for use.

FIG. 5 is a perspective view of the leash bag 10, showing how it is readied for use. Through engaging the zipper closure 12A 12B with zipper pull 12C the bag folds onto itself, forming an open-topped bag with interior chamber for the temporary storage of filled dog waste bags. Upon engaging the zipper closure 12A 12B, the elongated retainer straps 11A 11B are aligned and ready for engagement. Also shown is the utility hook 17 attached to hook strap 16.

Figure 6:
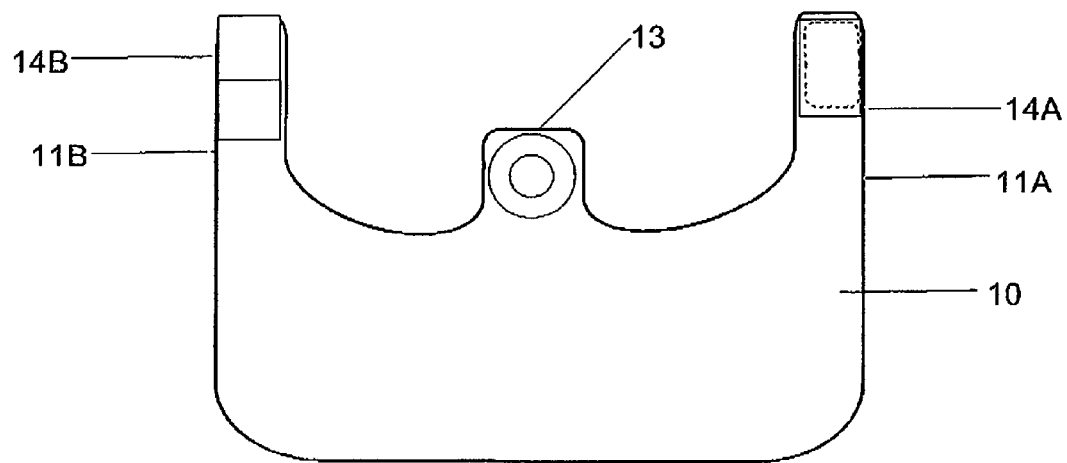
FIG. 6 is a back view of the improved leash bag in its open state.

FIG. 6 is a back view of the leash bag in its open state, showing the location of engageable portions of hook-and-loop tape 14A 14B on the vertically elongated retainer strap area 11A 11B. Also shown is the location of the reinforced leash-access orifice 13. Aside from the reinforced leash-access orifice 13, the interior storage chamber is free of adornment or impediment. Other embodiments may include a clip, pocket or strap with hook for securing a charcoal odor-absorbing bag or other items.

Figure 7:
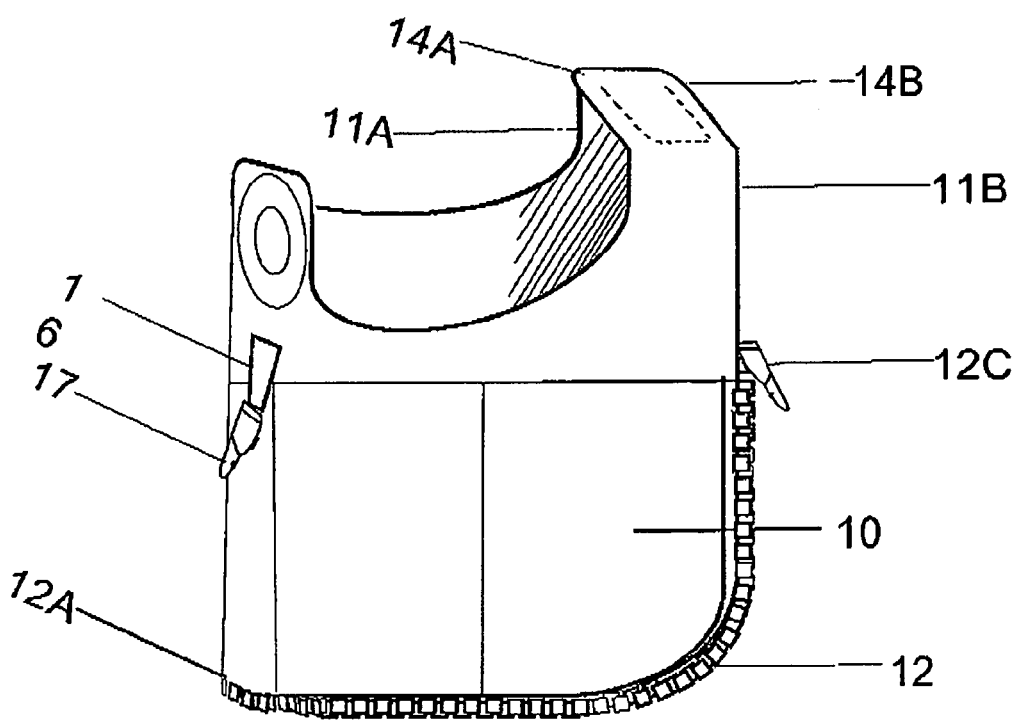
FIG. 7 is a perspective view of leash bag in its finished, ready-to-use form.

FIG. 7 is a perspective view of leash bag 10 in its usable state showing the portions of hook-and-loop tape 14A 14B on vertically elongated retainer straps 11A 11B engaged to secure leash bag to leash or other carrying device. The clip end of a leash or other item to which the bag will be attached (not shown) is passed through the reinforced leash-access orifice 13 thus engaging the secondary attachment means.

Operation—FIGS. 5,7

One uses the leash bag by first ensuring the zipper closure 12A 12B are engaged with zipper pull 12C in the standard manner of zipping a zipper closed; by doing so, the flat material becomes an open-topped receptacle, or pet waste leash bag. User can place supplies and personal belongings in the exterior top-opening pockets and/or attached to the utility hook at this time, or wait until finishing attachment to leash or other carrying device.

In this embodiment, user places front wall retainer strap 11B on one side of the leash handle and rear wall retainer strap 11A on the other side of the leash handle; this aligns the corresponding portions of hook-and-loop tape. User presses the corresponding portions of hook-and-loop tape together, thereby securing the leash bag to the handle portion of the leash. User threads the hook end of the leash through the reinforced leash access orifice 13 before attaching hook to dog's collar.

After dog has defecated, the necessary waste bag is removed from the exterior top-opening pocket 15 or a bag carrier attached to the utility hook 17 and waste is retrieved. User then twists or ties waste bag and drops it into the leash bag interior waste chamber. User can continue on their walk, stopping to retrieve and transport additional dog fecal matter as necessary.

Upon arriving at an appropriate waste disposal station, i.e. trash can, user will place the leash bag 10 over receptacle opening, grasp the zipper pull 13 on the side of the leash bag and with a downward motion, pull the zipper pull until the improved leash bag is opened enough to tip the filled waste bags out of the interior storage chamber and into waste receptacle. User will then reverse the zipper action, again closing the improved leash bag for further use.

User may also opt to reach into interior storage chamber, grasp waste-filled bag, pull out and place into waste receptacle.

CONCLUSION, RAMIFICATIONS, AND SCOPE

Accordingly, the reader will see that improved leash bag addresses the need to provide a leash-carried or hands-free method of transporting both personal items as well as dog waste, allowing dog walker greater leash control of his pet, lesser chances of contact with fecal matter, and accessibility to necessary pet related and personal belongings. It provides for a generously sized open-topped interior storage compartment for dog waste, it provides a hands-off method of dumping said waste in appropriate refuse collection unit. Furthermore, improved leash bag can be pre-loaded and remain attached to the dog leash, to ensure all items necessary for a dog walk are at hand for each outing. The design and materials of one embodiment of improved leash bag provide inherent benefits to the user, such as minimizing the odor emitted from the storage compartment, easy cleaning and it is waterproof and bacteria resistant.

I claim:

1. A leash bag comprising:
   a first portion having a first hook-and-loop tape at a first end of the leash bag;
   a second portion having a second hook-and-loop tape at a second end of the leash bag, the second end opposite the first end;
   an orifice positioned between the first portion and the second portion, the orifice is sized and shaped for inserting a leash therethrough;
   a closure extending between the first end of the leash bag and the second end of the leash bag; and
   a receptacle area formed by bending or folding the first end toward the second end and securing the first end to the second end in a bent or folded position, wherein the closure secures the first portion to the second portion to form walls, and further wherein the closure forms a bottom of the receptacle area, wherein the closure is a zipper closure and is secured along the bottom of the leash bag from a location below the orifice at the bent or folded position toward the first hook-and-loop tape.

2. The leash bag of claim 1 wherein the first hook-and-loop tape is securable to the second hook-and-loop tape to secure the first portion to the second portion to form the receptacle area.

3. The leash bag of claim 1 wherein the leash bag has a first length prior to being bent or folded, and further wherein the leash bag at the bent or folded position has a second length defined between the orifice at a first top end and the first hook-and-loop tape and the second hook-and-loop at a second top end, opposite the first top end.

4. The leash bag of claim 3 wherein the second length is approximately half of the first length.

5. The leash bag of claim 1 wherein the first portion and the second portion are formed from solitary and unseamed fabric.

6. The leash bag of claim 1 further comprising:
   a pocket on an exterior of the first portion or the second portion, the receptacle area formed within an interior of the first portion and the second portion.

7. The leash bag of claim 1 wherein the first portion has a first extended strap, the first hook-and-loop tape positioned at the first extended strap, and further wherein the second portion has a second extended strap, the second hook-and-loop tape positioned at the second extended strap.

8. The leash bag of claim 1 wherein the first hook-and-loop tape and the second hook-and-loop tape are securable to a leash handle to prevent the leash from moving through the orifice.

9. The leash bag of claim 1 wherein the closure is movable to unsecure the bottom to the first portion or the second portion such that contents within the receptacle area are movable through an opening between the bottom and the first portion or the second portion.

10. The leash bag of claim 1 wherein the first portion is folded or bended onto the second portion prior to securing the first hook-and-loop tape to the second hook-and-loop tape.

11. A leash bag comprising:
- a first portion having a first retainer strap at a first end of the leash bag;
- a second portion having a second retainer strap positioned at a second end of the leash bag, the second end opposite the first end;
- an orifice positioned between the first retainer strap and the second retainer strap, the orifice sized and shaped for receiving a leash therethrough;
- a closure extending between the first end of the leash bag and the second end of the leash bag, the closure engagable to align and permit engagement of the first retainer strap with the second retainer strap;
- an interior chamber formed from folding or bending the first portion onto the second portion and securing the first end to the second end in a bent of folded position, wherein the closure secures the first portion to the second portion for form walls and further wherein the closure forms a bottom of the interior chamber, positioned between the closure and the first retainer strap; and
- wherein the closure is a zipper closure and is secured along the bottom of the leash bag from a location below the orifice at the bent or folded position toward the first retainer strap.

12. The leash bag of claim 11 wherein the first retainer strap has a hook-and-loop tape and the second retainer strap has a hook-and-loop tape and further wherein the orifice is approximately the same distance from the first retainer strap as the second retainer strap.

13. The leash bag of claim 12 wherein unzipping the zipper closure opens the interior chamber such that contents within the interior chamber moves through the interior chamber away from the orifice.

14. The leash bag of claim 13 further comprising:
- a pocket on the first portion or the second portion on an external side of the leash bag, the pocket formed of a mesh material with an elastic top.

* * * * *